United States Patent [19]

Mullins

[11] Patent Number: 4,837,941
[45] Date of Patent: Jun. 13, 1989

[54] PRESET TOOL GAUGE

[75] Inventor: Dennis R. Mullins, Oakwood, Ohio

[73] Assignee: Dana Corporation, Toledo, Ohio

[21] Appl. No.: 113,943

[22] Filed: Oct. 28, 1987

[51] Int. Cl.⁴ .............................................. B27G 23/00
[52] U.S. Cl. .......................................... 33/626; 33/638
[58] Field of Search .................................. 33/638-641, 33/626-632, 201, 178 B, 168 R, 535, 567

[56] References Cited

U.S. PATENT DOCUMENTS

| | | |
|---|---|---|
| 1,050,455 | 1/1913 | Harrold . |
| 2,105,962 | 1/1938 | Bickel . |
| 2,372,427 | 3/1945 | Johnson . |
| 2,542,938 | 2/1951 | Morris ................................ 33/626 X |
| 2,556,067 | 6/1951 | Coffer ................................... 33/638 |
| 2,565,924 | 8/1951 | Kraft ..................................... 33/638 |
| 2,657,470 | 11/1953 | Allen et al. ............................ 33/637 |
| 2,933,815 | 4/1960 | Czaplinski . |

4,161,824 7/1979 Riha ............................ 33/168 R X

Primary Examiner—Harry N. Haroian
Attorney, Agent, or Firm—Frank B. McDonald

[57] ABSTRACT

A plurality of cylindrical gauges are used for presetting the position of a cutting tool along the tool axis of a machine for sizing a workpiece, such as a turret lathe. In a preferred form, the machine includes a pair of orthogonal axes, along which one axis supports a cutting tool, and a workpiece is supported along the second. To preset a tool position, a selected gauge is installed along the second axis, while the cutting tool is adjusted along the first axis to make contact with the gauge. Upon contact, the tool is secured into position, the gauge is removed, and a workpiece is substituted in place thereof along the second axis, the position of the cutting tool having been preset for subsequent sizing of the workpiece.

7 Claims, 1 Drawing Sheet

PRESET TOOL GAUGE

BACKGROUND OF THE INVENTION

This invention relates to adjustment mechanisms for machines adapted to remove material, such as lathes. More particularly, this invention relates to the use of gauges designed to facilitate the positioning of a cutting tool for accurate machining of a workpiece to a preset size.

A number of prior art mechanisms have been utilized for the purpose of presetting or controlling limits of positions of cutting tools adapted to size workpieces. Many of these devices have had relatively cumbersome designs and have been relatively expensive. The more modern of such devices involves the use of numerical controls for presetting and positioning cutting tools on lathes. However, in applications involving non-numerical systems, a simpler device would be more convenient for rapid setups or changes.

SUMMARY OF THE INVENTION

The present invention provides a simple and inexpensive system for presetting positions of tools adapted to size workpieces, particularly on cutting tool machines such as lathes. In a preferred form, the system provides a plurality of gauges, each having cylindrical bodies with specified diameters for presetting the positions of cutting tools. In the same preferred form, a cutting tool is adjustably secured along a first axis, while a workpiece is normally secured along a second axis disposed orthogonally to the first axis. For position presetting, a gauge preselected from the plurality of such gauges is installed along the second axis, and the cutting tool is adjusted to the point of contact of the side or lateral dimension of the gauge. This process establishes a predetermined diameter about which a workpiece may be subsequently sized by the cutting tool.

The present invention discloses two embodiments of such gauges; a first having a "bored" cylindrical body, wherein a coaxially aligned bore extends through the body. The second provides a solid cylindrical body having a coaxially oriented projection suitable for securement in a chuck element of a lathe or other suitable holding mechanism. The bored embodiment, on the other hand, is designed for support by an elongated support member projecting from and secured within a chuck. In the latter instance, the diameter of the bore is sized to a tolerance of two to three thousandths of an inch with respect to the outer diameter of the support member.

DETAILED DESCRIPTION OF PREFERRED EMBODIMENTS

Figure 1:
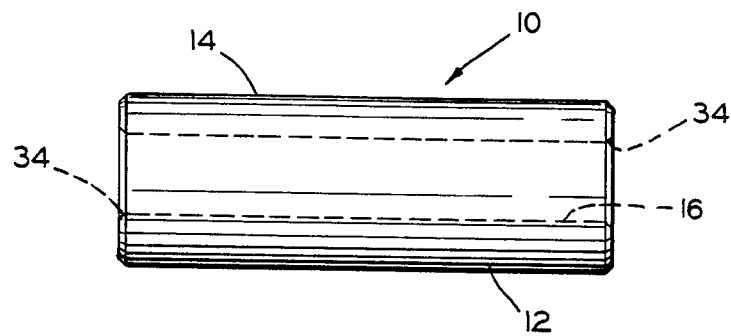
FIG. 1 is a side view of a first embodiment of the preset tool gauge, which includes a coaxially aligned bore therethrough, as constructed in accordance with the present invention.
Figure 3:
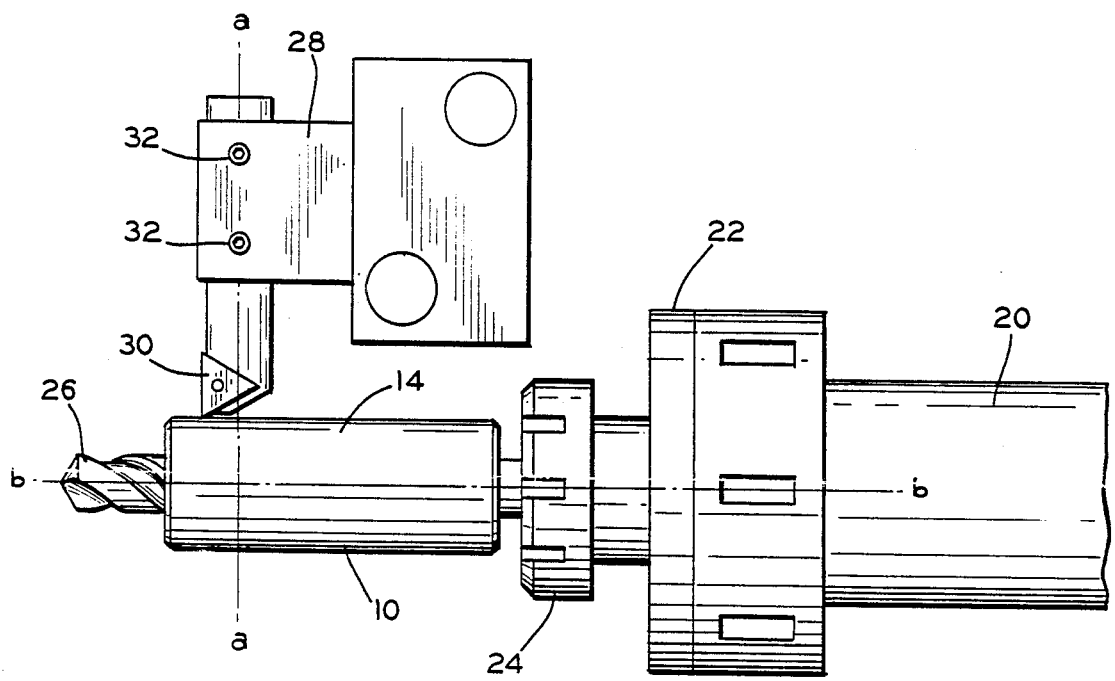
FIG. 3 is a fragmentary view of a lathe adapted for removal of material from a workpiece, which incorporates the first embodiment of the preset tool gauge.

Referring initially to FIG. 1, a first preferred embodiment of a preset tool gauge 10 is shown. The gauge 10 includes an annular body 12 having a cylindrical outer surface 14. A plurality of such gauges are employed, each gauge being specifically sized to accommodate a preset dimension of a cutting tool relative to the turning axis of a lathe or other metal removal machine. In FIG. 3, a turret lathe 20, shown fragmentarily, includes a turret head 22 which contains a lathe chuck 24. It will be seen that a selected tool gauge 10 is employed within the machine 20, and is positioned to intersect an axis "a-a" for the purpose of adjusting a cutting tool 30. A turning axis, shown as "b-b", is coincident with the axis of the lathe chuck 24 which holds an elongated support member or element 26 for supporting the gauge 10; here, conveniently, a drill bit. For purposes of achieving desired accuracy, tolerance between the diameter of the drill bit 26 and the diameter of the inner-cylindrical surface 16 of the tool gauge 10 should be no more than 2-3 thousandths of an inch. Also in the preferred form, for achieving acceptable accuracy of cutting tool position, the outer-cylindrical surface 14 should have a diameter which falls within a tolerance of plus or minus 2 thousandths.

It will be noted that once an appropriately sized gauge 10 is installed over the drill bit 26, the tool 30 may then be adjusted along the axis "a-a" by loosening a pair of screws 32 which form part of a tool holder 28. This permits movement of the tool 30 along the axis "a-a", which is orthogonal to the axis "b-b". Upon establishing physical contact between the tool 30 and the outer-cylindrical surface 14 of the gauge 10, the screws 32 are tightened to lock the cutting tool 30 into position. Upon removal of the gauge 10 and the drill bit 26, a workpiece may be installed within the chuck 24, the tool then having been preset for appropriately sizing the workpiece as desired.

Referring back to FIG. 1, it will be noted that for convenience, the inner-cylindrical surface 16 may be chamfered as shown at 34 at both ends. It will also be appreciated by those skilled in the art that a plurality of such gauges will be used, each having a specific and identifiable outer diameter for the purpose of accurately positioning and hence presetting the tool. In the sense of this invention, the term "identifiable" means readily identifiable without measurement, preferably by visual means as via numerical embossment.

Figure 2:
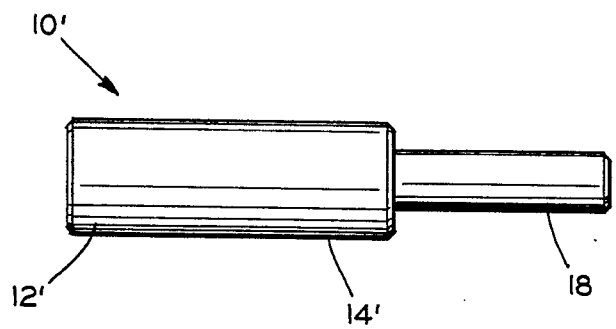
FIG. 2 is a second preferred embodiment of a preset tool gauge having a coaxially aligned projection, as constructed in accordance with the present invention.

Referring now to FIG. 2, a second preferred embodiment of a preset tool gauge 10' is shown. It will be appreciated that the outer-cylindrical surface 14' of the second preferred embodiment is analogous to the outer-cylindrical surface 14 of the first preferred embodiment. However, the gauge 10' is not annular to the extent that it includes no internal bore, and hence no inner-cylindrical surface capable of being supported by an elongated support member such as a drill bit 26. Instead, the second preferred embodiment 10' includes a shank 18 which defines a projection integrally attached to a first body portion 12' and coaxial with the first body portion 12', permitting direct securement in a chuck without the requirement of a drill bit or other support member.

Finally, it will also be appreciated by those skilled in the art that such gauges may be hardened by heat treatment. In addition, today's technology will permit gauge surfaces to be ground down to tolerances with a range of +0.0005 of an inch depending on the desired final tolerance of the workpiece.

Although only two preferred embodiments have been shown and described herein, the following claims are envisioned to cover numerous alternative embodiments which may fall within the spirit and scope thereof.

What is claimed is:

1. A machine for removing material from a workpiece, including a cutting tool adapted to contact the workpiece along a first axis, means for support of the workpiece along a second axis orthogonal to said first axis, a cylindrical support member having an outer diameter supported by said means for support along said second axis, a system of gauges, each gauge adapted for positioning said cutting tool along said first axis to a predetermined distance from said second axis, each gauge comprising an annular cylindrical body including an inner-cylindrical surface and an outer-cylindrical surface, said inner-cylindrical surface defining an inner diameter slightly greater than the outer diameter of said cylindrical support wherein said body is snugly inserted over said cylindrical support member under a specific tolerance range, said outer-cylindrical surface defining an outer diameter located at said predetermined distance relative to said second axis.

2. The machine of claim 1 wherein the inner-cylindrical surface of each gauge is coaxially positioned with respect to its outer-cylindrical surface.

3. The machine of claim 2 wherein said means for supporting said work piece along said second axis also comprises said means for support of said cylindrical support member.

4. The machine of claim 3 wherein said inner-cylindrical surface of said gauge has a tolerance of two to three thousandths of an inch with respect to said cylindrical support member.

5. The machine of claim 1, wherein said inner-cylindrical surface defines a bore through said gauge, and wherein said bore contains chamfered ends.

6. The machine of claim 1, wherein each of said gauges comprises an outer cylindrical surface having a diameter which falls within a tolerance of plus or minus two thousandths of an inch.

7. The machine of claim 1, wherein each of said gauges has an outer cylindrical surface which is not heat treated.

* * * * *